(12) United States Patent
Peters et al.

(10) Patent No.: US 8,521,399 B2
(45) Date of Patent: Aug. 27, 2013

(54) SYSTEM AND METHOD FOR REDUCING PARTICULATE MATTER PRODUCED BY AN ENGINE

(75) Inventors: Mark W. Peters, Wolverine Lake, MI (US); Eric Krengel, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 712 days.

(21) Appl. No.: 12/633,342

(22) Filed: Dec. 8, 2009

(65) Prior Publication Data

US 2011/0132325 A1   Jun. 9, 2011

(51) Int. Cl.
*G06F 17/00* (2006.01)
*F02P 5/00* (2006.01)

(52) U.S. Cl.
USPC ................................ 701/103; 123/406.47

(58) Field of Classification Search
USPC .......... 123/406.23, 406.47, 406.48; 701/103
See application file for complete search history.

(56) References Cited

U.S. PATENT DOCUMENTS

| | | | | |
|---|---|---|---|---|
| 5,178,104 | A * | 1/1993 | Ito et al. | 123/73 A |
| 5,909,723 | A * | 6/1999 | Ichimoto et al. | 123/406.19 |
| 6,655,133 | B2 * | 12/2003 | Mikami et al. | 60/296 |
| 6,935,307 | B2 * | 8/2005 | Watanabe et al. | 123/339.16 |
| 7,239,954 | B2 * | 7/2007 | Huang | 701/103 |
| 7,475,671 | B1 * | 1/2009 | Fattic et al. | 123/406.47 |

\* cited by examiner

*Primary Examiner* — Mahmoud Gimie
*Assistant Examiner* — David Hamaoui
(74) *Attorney, Agent, or Firm* — Julia Voutyras; Alleman Hall McCoy Russell & Tuttle LLP

(57) ABSTRACT

A method for reducing particulate matter emitted by an engine is disclosed. In one example, the start of fuel injection timing is adjusted in response to a change in engine operating conditions. In particular, start of injection timing may be advanced and then retarded to promote fuel vaporization.

10 Claims, 6 Drawing Sheets

US 8,521,399 B2

SYSTEM AND METHOD FOR REDUCING PARTICULATE MATTER PRODUCED BY AN ENGINE

TECHNICAL FIELD

The present application relates to the field of automotive fuel control systems and methods.

BACKGROUND AND SUMMARY

Direct injection engines may provide increased engine performance while at the same time reducing some transient fueling problems associated with port fuel injected engines. For example, injecting fuel directly into a cylinder can reduce or eliminate fuel puddles in intake ports. Further, vaporization of injected fuel can extract heat energy from an incoming cylinder charge so that additional air can enter an engine cylinder and increase the cylinder charge. Thus, direct injection engines may provide certain advantages over port fuel injected engines.

Direct injection engines may, however, have some disadvantages over port fuel injected engines. In particular, direct fuel injected engines may produce soot during some conditions. For example, soot may be formed when injected fuel is partially combusted, and some directly injected fuel may not completely combust during a cylinder cycle when fuel partially vaporizes or condenses in the cylinder. Partial vaporization or condensation of fuel may occur when conditions for combustion change between cylinder cycles. For example, soot may be produced when engine load in changed or when an amount of exhaust gas recirculation (EGR) is changed.

The inventors herein have developed a method for controlling soot produced by a direct injection engine. Specifically, the inventors have developed a method for directly injecting fuel to cylinder of an engine, comprising: in response to a change in load, adjusting start of injection timing away from a first timing and then back toward said first timing to a second timing during the change in load, said second timing different from said first timing.

Soot may be reduced in a direct injection engine by adjusting injection timing in response to a change in engine operating conditions. For example, injection timing can be temporarily advanced for one or more cylinder cycles during a change from a lower engine load to a higher engine load. By first advancing and then retarding injection timing, it may be possible to reduce the amount of fuel that may form on surfaces in the cylinder when fuel is injected. Advancing injection timing may enable fuel to enter the cylinder at a time when the piston is lower in the cylinder so that a larger portion of the injected fuel may vaporize in the cylinder rather than collecting on the piston. The advanced fuel timing can then be returned to an injection timing that is suited for steady-state engine operating conditions. Thus, upon a change in engine conditions, injection timing can be advanced for one or more cylinder cycles and then retarded to a timing that is desirable for steady-state conditions.

The present description may provide several advantages. Specifically, the approach may improve engine emissions by lowering the production of soot. Further, the method can reduce system cost because exhaust gas after treatment devices may be reduced in size. In addition, regeneration of a particulate filter that captures soot exhausted from engine cylinders may be performed less frequently because less soot may be deposited on the filter.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DEPICTED EMBODIMENTS

Figure 1:
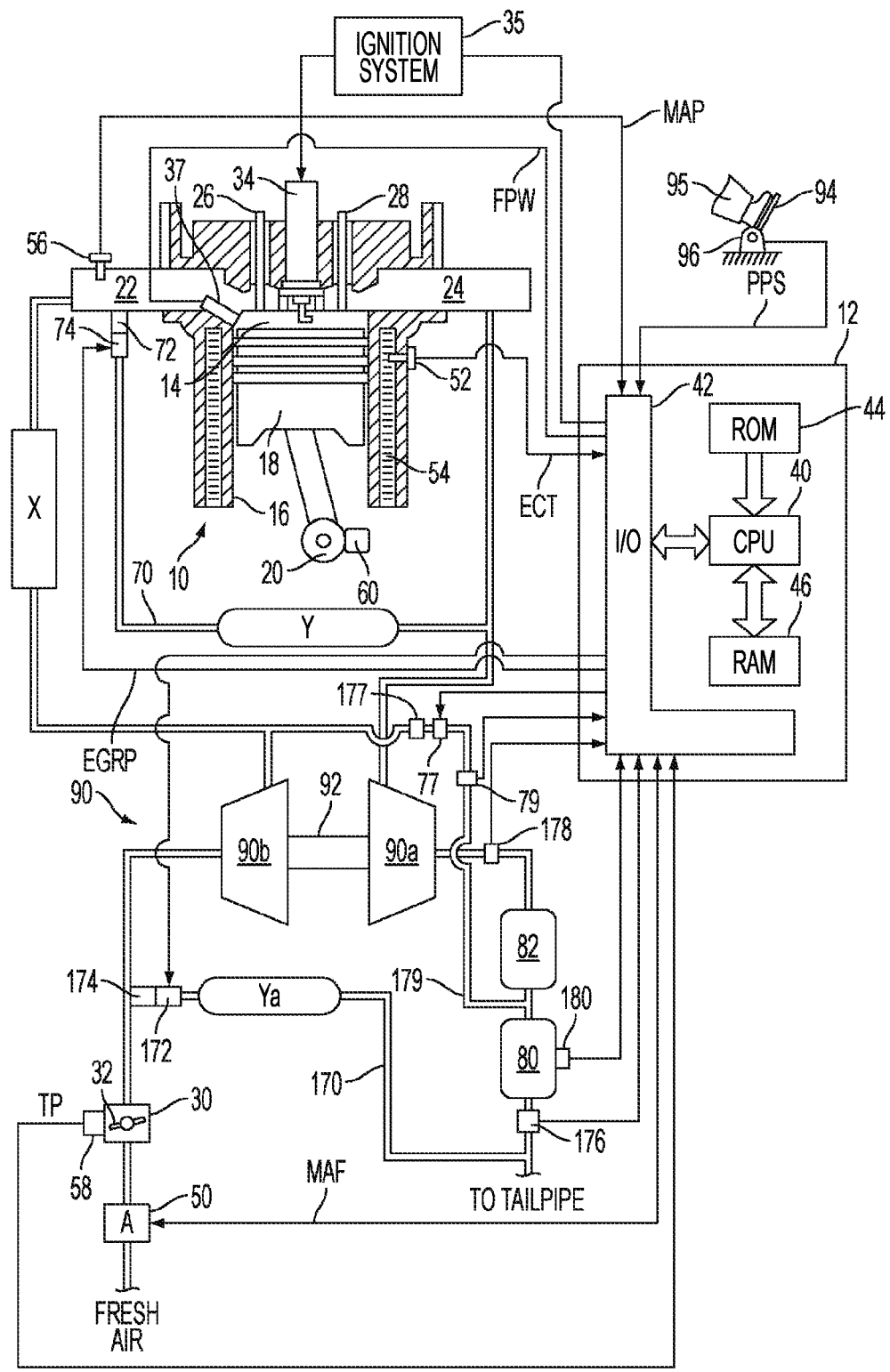
FIG. 1 shows a schematic view of an exemplary embodiment of a gasoline direct injection engine.

FIG. 1 shows an exemplary embodiment of a gasoline direct injection engine system generally at 10. Specifically, internal combustion engine 10 comprises a plurality of cylinders, one cylinder of which is shown in FIG. 1. Engine 10 is controlled by electronic engine controller 12. Engine 10 includes combustion chamber 14 and cylinder walls 16 with piston 18 positioned therein and connected to crankshaft 20. Combustion chamber 14 communicates with an intake manifold 22 and an exhaust manifold 24 via respective intake valve 26 and exhaust valve 28.

Intake manifold 22 communicates with throttle body 30 via throttle plate 32. In one embodiment, an electronically controlled throttle can be used. In one embodiment, the throttle is electronically controlled to periodically, or continuously, maintain a specified vacuum level in intake manifold 22. Note that throttle body 30 and throttle plate 32 may be located at a location downstream of compression device 90 in some applications. In a configuration where the throttle is downstream from the compression device, the tap for flowing intake system gases to the exhaust system may be located downstream of the compression device and upstream of the throttle. Alternatively, throttle body 30 and throttle plate 32 may be omitted.

Combustion chamber 14 is also shown having fuel injector 37 coupled thereto for delivering fuel in proportion to the pulse width of signal (fpw) from controller 12. Fuel is delivered to fuel injector 37 by a conventional fuel system (not shown) including a fuel tank, fuel pump, and fuel rail (not shown). In the case of direct injection engines, as shown in FIG. 1, a high pressure fuel system is used such as a common rail system.

For gasoline engine applications, spark plug 34 provides an ignition source for the contents of combustion chamber 14. Energy for creating a spark is provided by ignition system 35.

Controller 12 adjusts the charging of ignition coils that provide voltage to spark plug 34. For diesel applications, spark plug 34 and ignition system 35 may be eliminated.

In the depicted embodiment, controller 12 is a conventional microcomputer, and includes a microprocessor unit 40, input/output ports 42, electronic memory 44, which may be an electronically programmable memory in this particular example, random access memory 46, and a conventional data bus.

Controller 12 receives various signals from sensors coupled to engine 10, including but not limited to: measurements of inducted mass airflow (MAF) from mass airflow sensor 50 coupled to the air filter [A on FIG. 1]; engine coolant temperature (ECT) from temperature sensor 52 coupled to cooling jacket 54; a measurement of manifold pressure (MAP) from manifold pressure sensor 56 coupled to intake manifold 22; a measurement of throttle position (TP) from throttle position sensor 58 coupled to throttle plate 32; a measurement of particulate filter temperature from temperature sensor 180; and a profile ignition pickup signal (PIP) from Hall effect (or variable reluctance) sensor 60 coupled to crankshaft 20 indicating engine speed.

Engine 10 may include an exhaust gas recirculation (EGR) system to help lower $NO_x$ and other emissions. For example, engine 10 may include a high pressure EGR system in which exhaust gas is delivered to intake manifold 22 by a high pressure EGR tube 70 communicating with exhaust manifold 24 at a location upstream of an exhaust turbine 90a of a compression device 90, and communicating with intake manifold 22 at a location downstream of an intake compressor 90b of compression device 90. The depicted high pressure EGR system includes high pressure EGR valve assembly 72 located in high pressure EGR tube 70. Exhaust gas travels from exhaust manifold 24 first through high pressure EGR valve assembly 72, and then to intake manifold 22. An EGR cooler [shown at Y in FIG. 1] may be located in high pressure EGR tube 70 to cool recirculated exhaust gases before entering the intake manifold. Cooling is typically done using engine water, but an air-to-air heat exchanger may also be used.

Engine 10 may also include a low pressure EGR system. The depicted low pressure EGR system includes a low pressure EGR tube 170 communicating with exhaust manifold 24 at a location downstream of exhaust turbine 90a, and communicating with intake manifold 22 at a location upstream of intake compressor 90b. A low pressure valve assembly 172 is located in low pressure EGR tube 170. Exhaust gas in the low pressure EGR loop travels from turbine 90a through a catalytic device 82 (for example, a three-way catalyst that may have a wash coat comprising platinum, palladium, and rhodium) and a particulate filter 80 before entering low pressure EGR tube 170. Catalytic device 82 processes engine exhaust gases to oxidize exhaust gas constituents, for example. A low pressure EGR cooler Ya may be positioned along low pressure EGR tube 170.

High pressure EGR valve assembly 72 and low pressure EGR valve assembly 172 each has a valve (not shown) for controlling a variable area restriction in high pressure EGR tube 70 and low pressure EGR tube 170, which thereby controls flow of high and low pressure EGR, respectively.

Particulate filter regeneration loop 179 is supplied pressurized air from compressor 90b. Pressurized air flows to a location in the exhaust system between catalyst 82 and particulate filter 80. Gases from the intake system may be provided from upstream of a throttle body or from downstream of a throttle body depending on system configuration. For example, if a compressor is located upstream of a throttle body, intake system gases can be driven from downstream of the compressor and upstream of the throttle body to the exhaust system. On the other hand, if the throttle body is located upstream of the compressor, intake system gases can be driven from downstream of the throttle body and upstream of the compressor to the exhaust system. In an alternative embodiment, an additional three-way catalyst may be positioned downstream of particulate filter 80. If desired, exhaust gases may be drawn through the particulate filter regeneration loop to the intake manifold during conditions when the engine is operating and when intake manifold is at a lower pressure than the exhaust system pressure between particulate filter 80 and catalyst 82.

Vacuum regulators 74, 174, and 177 are coupled to high pressure EGR valve assembly 72, low pressure EGR valve assembly 172, and particulate filter air supply valve assembly 77, respectively. Vacuum regulators 74, 174, 177 receive actuation signals from controller 12 for controlling the valve positions of high pressure EGR valve assembly 72, low pressure EGR valve assembly 172, and particulate filter supply valve assembly 77. In a preferred embodiment, high pressure EGR valve assembly 72 and low pressure EGR valve assembly 172 are vacuum actuated valves. However, any type of flow control valve or valves may be used such as, for example, an electrical solenoid powered valve or a stepper motor powered valve. Orifice and pressure sensor assembly 79 provide data that can be processed by controller 12 using Bernoulli's equation to determine flow between intake system and exhaust system when particulate filter air supply valve assembly 77 is in an open position.

Compression device 90 may be a turbocharger or any other such device. The depicted compression device 90 has a turbine 90a coupled in the exhaust manifold 24 and a compressor 90b coupled in the intake manifold 22 via an intercooler [shown at X in FIG. 1], which is typically an air-to-air heat exchanger, but could be water cooled. Turbine 90a is typically coupled to compressor 90b via a drive shaft 92. (This could also be a sequential turbocharger arrangement, single VGT, twin VGTs, or any other arrangement of turbochargers that could be used).

Concentration of oxygen present in the exhaust system may be assessed by oxygen sensors 178 and 176. Further, an additional oxygen sensor (not shown) may be placed between catalyst 82 and particulate filter 80. Oxygen sensor 178 senses engine feed-gas oxygen concentration while oxygen sensor 176 senses exhaust gas oxygen post-catalyst and post-particulate filter. Oxygen sensors may be wide range sensors having a linearized output or they may be sensors that indicate a high gain signal near stoichiometric conditions. Further, drive pedal 94 is shown along with a driver's foot 95. Pedal position sensor (pps) 96 measures angular position of the driver actuated pedal.

It will be understood that the depicted engine 10 is shown only for the purpose of example and that the systems and methods described herein may be implemented in or applied to any other suitable engine having any suitable components and/or arrangement of components.

Figure 2:
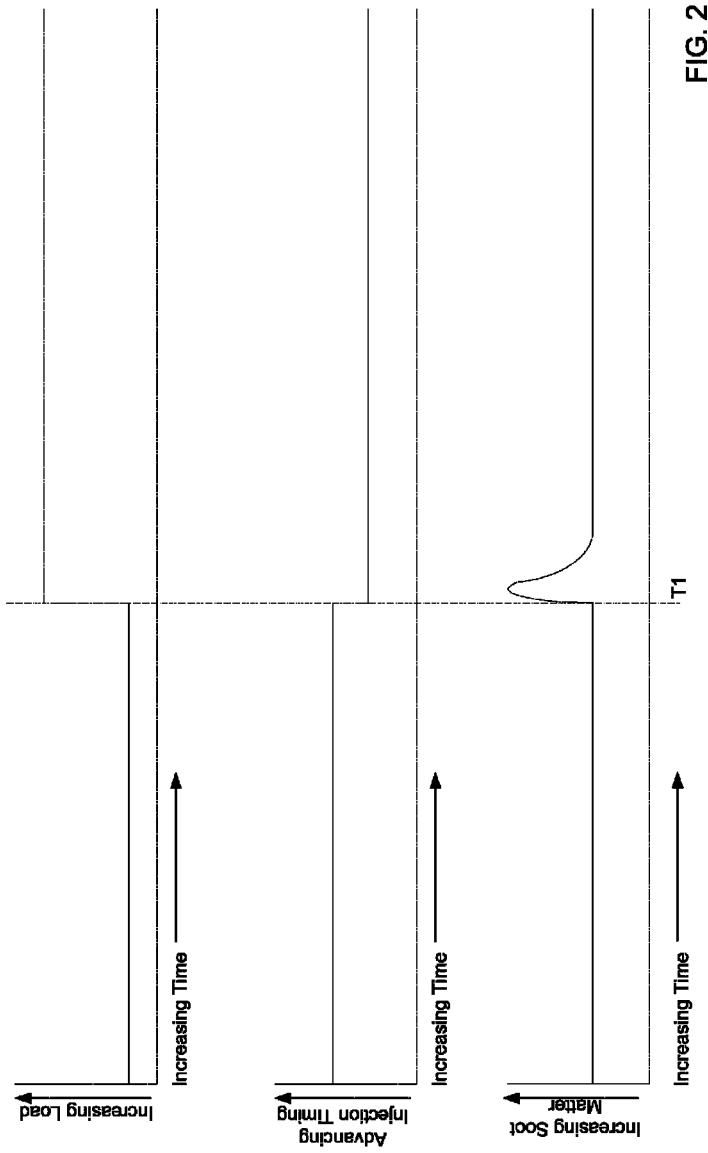
FIG. 2 shows a plot of a prior art method of injection timing signals during a change of operating conditions.

Referring now to FIG. 2, a plot of a prior art method of injection timing signals during a change of operating conditions is shown. Three separate plots of signals of interest are shown. Time begins at the left side of the figure and increases to the right side of the figure.

The first plot from the top of the figure shows engine load versus time. In one embodiment, engine load may be expressed as the amount of air inducted into a cylinder divided by the amount of air that can occupy full cylinder volume at standard temperature and pressure. Load increases in the plot as indicated by the arrow. At T1, engine load is increased in a step-like manner from a first engine load to a second engine load, the second engine load greater than the first engine load.

The second plot from the top of the figure shows direct injection fuel timing for start of injection versus time. Start of injection is advanced relative to crankshaft angle in the plot as indicated by the arrow. Start of injection refers to the crankshaft angle at which a fuel injector opens for a particular cylinder cycle (e.g., 720 crankshaft angle degrees for a cylinder cycle of a four cycle engine). At T1, injection timing is retarded relative to crankshaft angle in response to the change in engine load and continues at the retarded timing while the load remains constant.

The third plot from the top of the figure shows soot concentration in exhaust gases. At T1, in response to the change in engine load and injection timing soot increases and then decays as engine load stabilizes. Thus, soot correlation can be correlated to a change in an engine operating condition and injection. In other circumstances, exhaust gas recirculation, cam timing, and changes in engine speed may also increase soot production.

Figure 3:
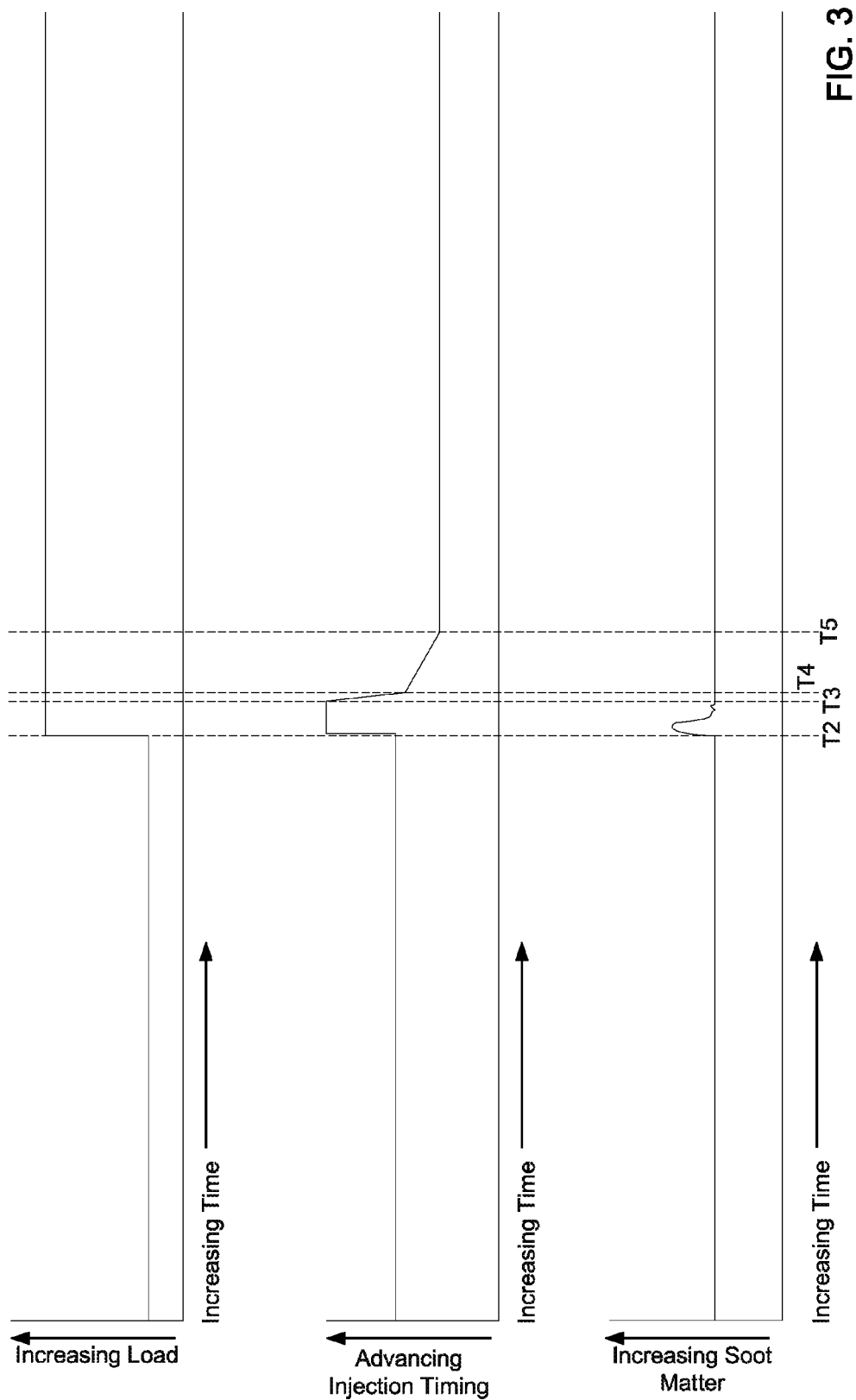
FIG. 3 shows a simulated plot of injection timing signals during a change of operating conditions.
Figure 6:
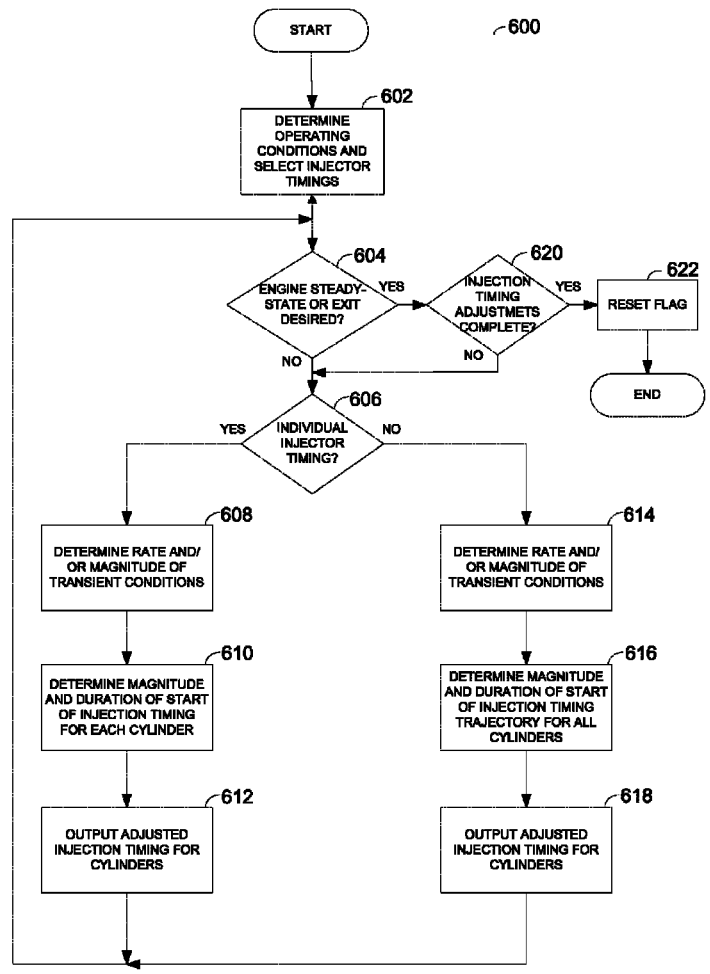
FIG. 6 shows a flow chart for an example routine for adjusting injection timing of a direct injection engine.

Referring now to FIG. 3, a simulated plot of an embodiment of the method of FIG. 6 illustrating injection timing signals during a change of operating conditions is shown. Three separate plots of signals of interest are shown. Time begins at the left side of the figure and increases to the right side of the figure.

Similar to FIG. 2, the first plot from the top of the figure shows engine load versus time. Load increases in the plot as indicated by the arrow. At T2, engine load is increased in a step-like manner from a first engine load to a second engine load the second engine load greater than the first engine load.

The second plot from the top of the figure shows direct injection fuel timing for start of injection versus time. Start of injection is advanced in the plot as indicated by the arrow. At T2, contrary to the method of FIG. 2, injection timing is advanced or moves away from the initial start of injection timing in response to the change in engine load. In one embodiment, the start of injection may be advanced in relation to one or more conditions. For example, during a change in engine load, start of injection can be advanced to a first crankshaft angle for a first type of fuel (e.g., gasoline). In another example, during a change in engine load, start of injection can be advanced to a second crankshaft angle for a second type of fuel (e.g., alcohol).

At T3, start of injection timing is retarded from the advanced position at T2 and begins to move toward the initial start of injection timing. Retarding start of injection timing may be time based or cylinder event (e.g., combustion event or intake event). For example, start of injection timing may be retarded at a rate of 10 crankshaft angle degrees per second. Alternatively, start of injection timing may be retarded at a rate of 5 crankshaft degrees per combustion event. Further, the rate of retarding injection timing may be related to operating conditions. For example, the rate of start of injection retard may be related to the type of fuel. In one example, when gasoline is injected to the engine start of injection timing may be commanded at a first rate. In another example, when alcohol is injected to the engine start of injection timing may be commanded at a second rate.

At T4, the rate of change for start of injection timing is reduced as the start of injection timing approaches start of injection timing for steady-state operating conditions. The rate of retard for changing start of injection may be determined empirically, by transient dynamometer testing for example. And, the rate of retard may be constant or it may change several times before reaching a desired start of injection timing for substantially constant engine operating conditions. In this example, the rate of change is adjusted two times, at T3 and T4, before the start of injection settles to a substantially constant crankshaft timing at T5. In other examples, the start of injection timing may follow a profile of $1^{st}$ order decay.

The third plot from the top of the figure shows soot concentration in exhaust gases. At T2, in response to the change in engine load and injection timing soot increases and then decays as engine load stabilizes. The soot formed with the method of start of injection timing adjustment shown in FIG. 3 is less than the amount of soot formed with the method of start of injection timing adjustment shown in FIG. 2 when the engine is operated under similar conditions. Thus, the illustrated method for adjusting timing of start of injection can reduce soot formed during changes in operating conditions.

Figure 4:
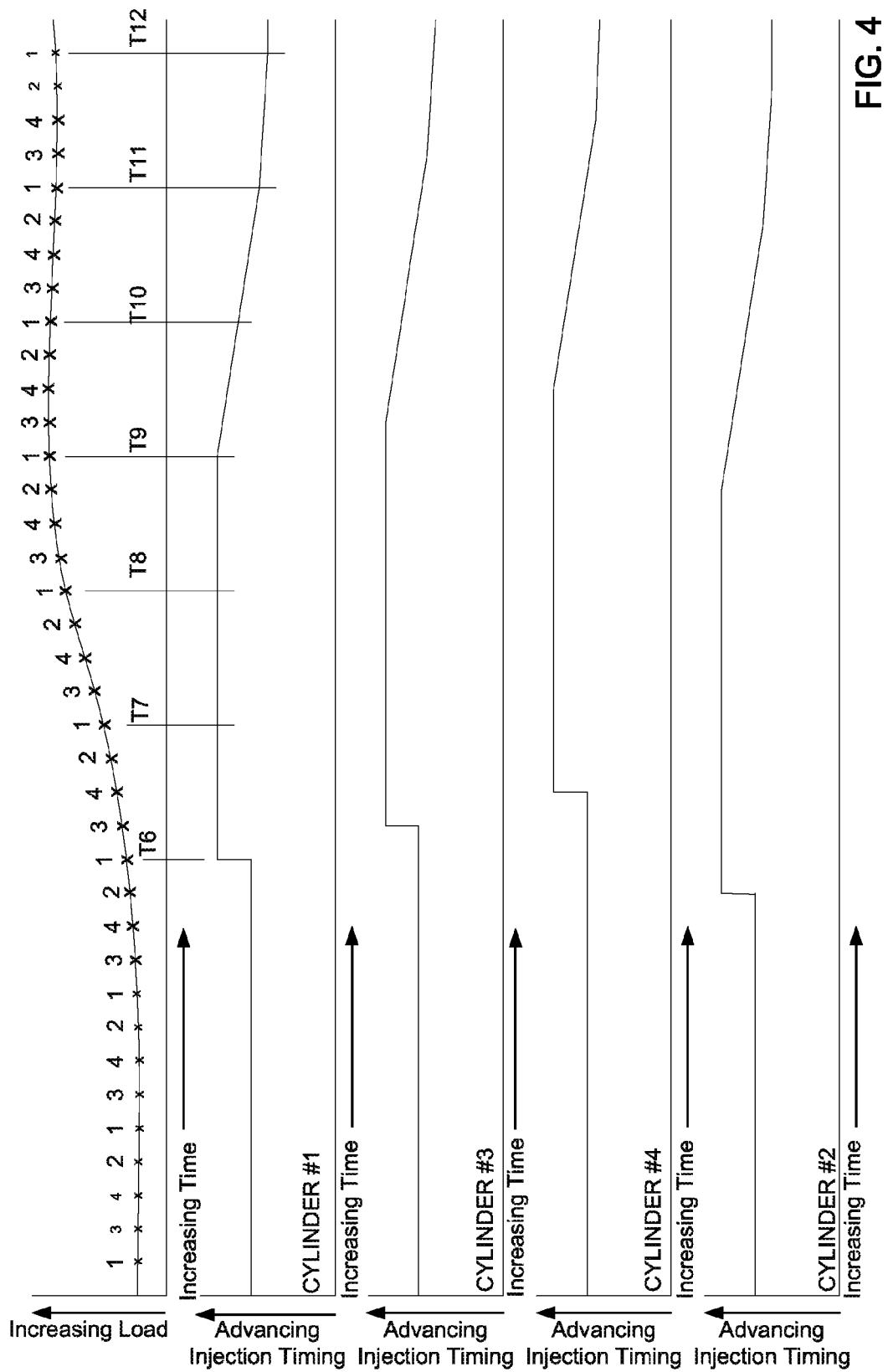
FIG. 4 shows a simulated plot of injection timing signals on a combustion event by combustion event basis for one example embodiment.

Referring now to FIG. 4, simulated plot of injection timing signals on a combustion event by combustion event basis for one example embodiment of the method of FIG. 6 is shown. The first plot from the top of the figure represents engine load during the time period of interest. Time increases from the left side of the plot to the right side of the plot and the data represents data at substantially constant engine speed. The engine load signal is shown with a series of Xs superimposed on the engine load line. The Xs indicate cylinder events (e.g., combustion events, intake events, exhaust events, intake valve opening events, a specific engine location such as top-dead-center compression stroke, or compression events) for cylinders of a four cylinder engine. The numbers above the Xs indicate the particular cylinder for which the event corresponds. The numbering follows the firing order for the engine (e.g., 1-3-4-2).

The next four plots down the figure from the first plot are plots of start of injection timing for each of the four cylinders according to the labeling of each plot. For example, the second plot from the top of the figure represents start of injection timing for cylinder number one. The injection timing for each cylinder advances from bottom to top of each start of injection timing plot. And, time increases from the left to right side of each plot.

Vertical lines T6-T12 are used to illustrate the relationship between start of injection for cylinder number one and cylinder events of cylinder number one as engine load changes. In one embodiment, an operating condition may have to change by a threshold amount before start of injection timing may be advanced. At T6, engine load has changed enough to cause a change in start of injection timing. Accordingly, start of injection timing is commanded advanced at T6 for cylinder number one. The actual advanced start of injection timing for cylinder number one may be delayed as compared to the event of cylinder one. For example, if the cylinder number one event is top-dead-center compression stroke, start of injection may be delayed an amount of crankshaft angle degrees before injection begins since intake valve opening and closing follows top-dead-center compression and since open valve or closed valve start of injection timing may be desired as start of injection timing is advanced.

T7-T9 represent subsequent cylinder number one events after start of injection timing is commanded advanced for cylinder number one. At T9, start of injection timing for cylinder number one begins to be retarded toward the original start of injection timing. It should be noted that the duration injection timing is advanced may vary in response to operating conditions. For example, injection timing may be at a most advanced position for a particular change in operating conditions for an amount of time or number of cylinder events that vary in response to the magnitude of change in operating conditions. In one example, start of injection timing may be advanced 25 crankshaft angle degrees for two cylinder events when engine load changes by 15%. In another example, start of injection timing may be advanced 25 crankshaft angle degrees for three cylinder events when engine load changes by 25%. Likewise, the amount of advance may be adjusted in response to the magnitude of change in operating conditions. For example, start of injection timing may be advanced 25 crankshaft angle degrees when engine load changes by 10%. In another example, start of injection timing may be advanced 35 crankshaft angle degrees when engine load changes by 25%.

At T11, start of injection timing is adjusted at a second rate, less than the rate from T9 to T11. It may be desirable to change the rate of start of injection timing to a lower rate of change as the start of injection timing approaches injection timing for steady state conditions after the change in engine operating conditions.

At T12, start of injection timing is commanded to a constant crankshaft angular position. In this example, the constant crankshaft angular position is retarded from the crankshaft angular position that start of injection timing occurred before the change in operating conditions. The steady-state start of injection timings may be experimentally determined and selected based on conditions such as engine emissions and fuel consumption.

In this example, start of injection timing for cylinders 2-4 vary from those of cylinder number one. In particular, advancing start of injection timings for cylinder number three and four are delayed from those of cylinder number one. Here, start of injection timing occurs later in time for cylinders three and four because cylinder events for cylinders number three and four occur after engine load changes by a threshold amount. Thus, the change in start of injecting timing for cylinders three and four is advanced later in time than for cylinder number one. Advancement of start of injection timing for cylinder number two begins before advancement of start of injection timing for cylinder number one because engine load has changed by a threshold amount when cylinder number two even occurs.

It should also be noted that while FIG. 4 shows substantially the same start of injection timings for cylinders 1-4, it is possible to provide different amounts of start of injection advancement and different durations of start of injection adjustments for each cylinder. For example, if the change in engine operating conditions is very short in duration, cylinder number one may be advanced 50 crankshaft angular degrees for one cylinder event and then retarded by 65 crankshaft angular degrees from the 50 crankshaft angular degree advancement point over four cylinder events. During the same change in operating conditions, cylinder number two may be advanced only 30 crankshaft angular degrees for one cylinder event and then retarded by 45 crankshaft angular degrees from the 30 crankshaft angular degree advancement point over three cylinder events. Thus, start of injection advancement timings and magnitudes may be different between cylinders during some changes in operating conditions.

Figure 5:
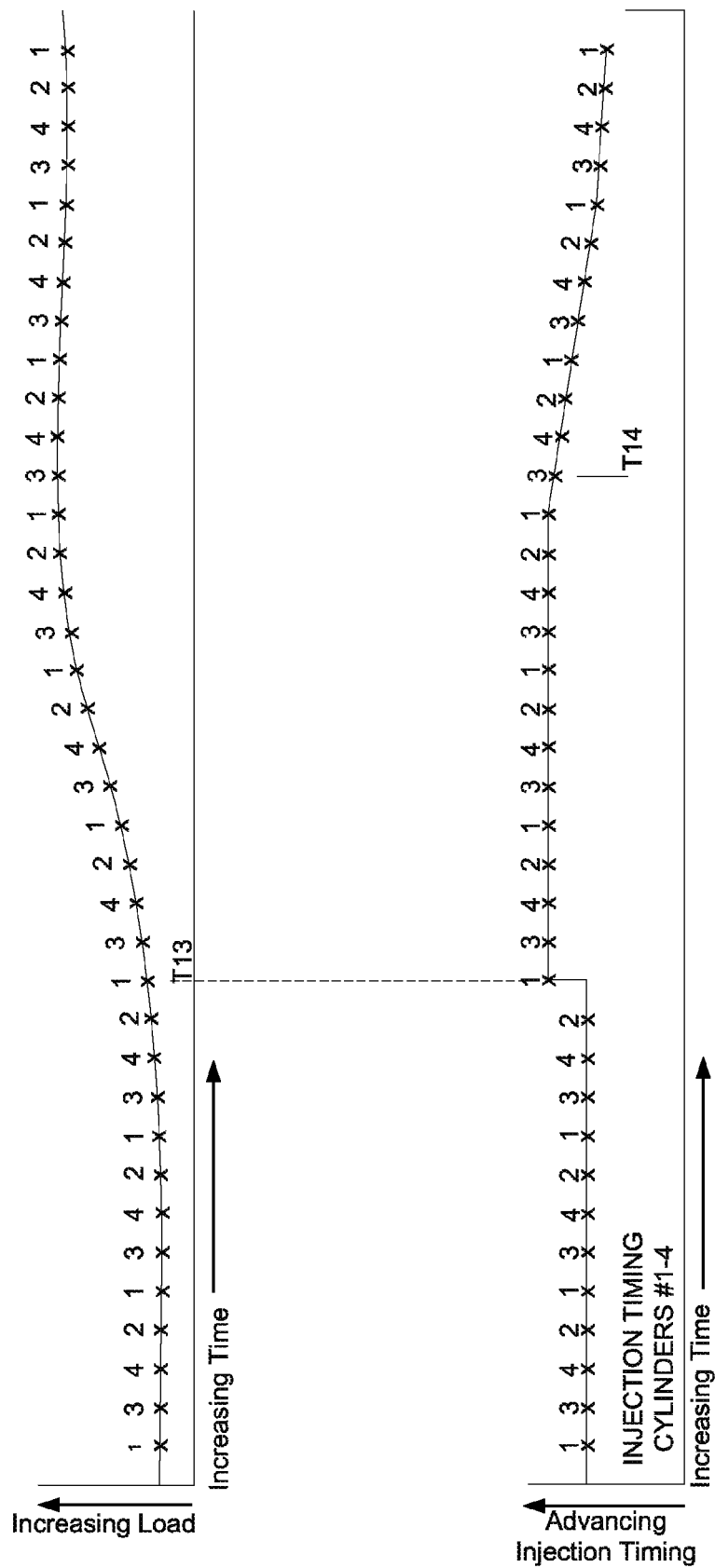
FIG. 5 shows a simulated plot of injection timing signals on a combustion event by combustion event basis for another example embodiment.

Referring now to FIG. 5, a simulated plot of injection timing signals on a combustion event by combustion event basis for another example embodiment of the method of FIG. 6 is shown. Similar to FIG. 4, the first plot from the top of FIG. 5 shows a plot of engine load. Engine load increases from the bottom to the top of the plot. And, cylinder events for a four cylinder engine are indicated by Xs positioned along the engine load line. Injection timing is shown in the second plot from the top of the figure. However, in this embodiment, a single start of injection timing profile is followed by all four cylinders. For example, at T13 engine conditions have changed enough for commanding a change in start of injection timing. Injection timing for all cylinders follows the trajectory illustrated by the second plot from the top of the figure. In particular, as illustrated by the plot, start of injection for timing for cylinders three, four, and two is made later in time than for cylinder number one. However, at T14 start of injection timing is first retarded for cylinder number three after start of injection is advanced at T13. Subsequently, start of injection timing is retarded for cylinder numbers one, two, and four at each cylinder event. In this way, a single trajectory may be used to adjust start of injection timing for engine cylinders in response to a change in operating conditions.

Referring now to FIG. 6, a flow chart for an example routine for adjusting injection timing of a direct injection engine is shown. At 602, routine 600 determines operating conditions. In one example, operating conditions may include engine speed, engine load, desired driver demand torque, engine air charge temperature, and engine temperature. In other examples, additional or fewer operating conditions may be determined at 602. Based on the determined operating conditions, base injector timing is determined by indexing a table or function of empirically determined start of injection timings. For example, present engine speed and load may be used to index a table that contains steady-state start of injection timings that provide desired emissions and fuel economy at the present engine speed and load. The start of injection timing retrieved from the table may then be loaded into a register that represents base start of injection timing for all cylinders (e.g., base_inj_start_loc). After operating conditions and base start of injection timing are determined, routine 600 proceeds to 604.

At 604, routine 600 determines if the engine is at substantially steady state conditions or if an exit is desired. In one example, routine 600 may determine an engine is not at steady state conditions if one or more of engine load, EGR, cam or valve timing, or engine speed are changing by more than a predetermine threshold amount in a direction that can increase cylinder load. For example, if engine load changes by more than 10% over a predetermined period (e.g., 0-10 seconds or 1-500 combustion events) it may be determined that the engine is not at steady-state conditions. In another example, it may be determined that the engine is not at steady-state conditions if engine speed changes by more than 500 RPM over a 10 second interval. When transient conditions are determined, routine 600 sets a control flag to indicate a transient is underway. Further, a timer or cylinder event counter is started. The timer or cylinder event counter indicates the duration since the transient engine condition occurred. In one embodiment, the timer or cylinder event counter may be reset if there is a subsequent change in operating conditions that can decrease engine load followed by a change in operating conditions that can increase engine load. Further, the timer or cylinder event counter may be reset if there is a subsequent change in operating conditions that exceeds the previous change or rate of change in operating conditions. In this way, routine 600 may respond to multiple changes in operating conditions so that at 610, the start of injection timing may be adjusted for one-after-the-other changes in engine operating conditions.

An exit of routine 600 may be desirable under some operating conditions. For example, if engine temperature is below a threshold temperature it may be desirable to exit routine 600 before adjusting start of injection timing. In another example, routine 600 may exit and temporarily deactivate if concentration of alcohol in engine fuel increases to more than a threshold amount. If routine 600 determines the engine is at steady-state conditions or an exit is desired, routine 600 proceeds to exit. Otherwise, routine 600 sets a control flag to indicate a transient is underway and proceeds to 606.

At 606, routine decides whether or not to adjust start of injection by providing individual start of injection trajectories for individual injectors or by providing a single start of injection trajectory for all injectors. In one embodiment, routine 600 determines individual injector trajectories in response to factory calibration programming. In an alternative embodiment, routine 600 may determine to provide individual injector trajectories in response to operating conditions. For example, individual start of injection timings may be provided such as those illustrated in FIG. 4 when engine temperature is greater than a threshold amount. Otherwise, all injectors may follow a single start of injection trajectory in the order of combustion as illustrated in FIG. 5. In another embodiment, selection between individual start of injection timings and a single start of injection trajectory may be determined in response to the magnitude of the change in engine operating conditions or in response to engine speed. For example, individual start of injection timings may be commanded when engine speed is less than a threshold amount because of reduced computational loading on the engine controller. If engine speed exceeds a threshold, start of injection for all cylinders may follow a single trajectory as illustrated in FIG. 5. Likewise, in one embodiment, start of injection timing for a change in engine load may permit individual start of injection trajectories for each cylinder injector when engine load is less than a threshold amount. If engine load exceeds the threshold amount, a single start of injection trajectory may be provided for all cylinders. If individual injector timing is desired, routine 600 proceeds to 608. Otherwise, routine 600 proceeds to 614.

At 608, routine 600 determines the rate and/or magnitude of transient engine conditions. In one example, the rate of change in operating conditions can be determined between cylinder events. For example, engine load may be sampled at predetermined crankshaft intervals (e.g., top-dead-center compression stroke or bottom-dead-center expansion stroke) or at predetermined cylinder events (e.g., during an intake stroke or during a combustion event). The engine load measured during the present interval can be subtracted from the engine load sampled during a past interval to determine the change in load over the interval. The change in load divided by the time between engine load samples indicates the rate of change of engine load. The magnitude of change of operating conditions may be determined by subtracting the present value of an operating condition from a previous value of the operating condition. During a change in operating conditions determined at 604, the magnitude and/or rate of change in operating conditions may be held to the highest or greatest value during the particular change in operating conditions. And, similar to the timer and cylinder event counter mentioned above, the magnitude and/or rate of change may be updated if there is a subsequent change in operating conditions that can decrease engine load followed by a change in operating conditions that can increase engine load. Further, the magnitude and/or rate of change may be updated if there is a subsequent change in operating conditions that exceeds the previous change or rate of change in operating conditions. In this way, start of injection adjustments may be made when one-after-the-other changes in operating conditions are present without the engine entering steady state conditions.

At 610, routine 600 determines the trajectory for start of injection timing for each injector of each cylinder. In other words, at 610, routine 600 determines adjustments to start of injection timing in response to a change in operating conditions. In one embodiment, one or more variables that may represent a change in operating conditions (e.g., engine load, EGR, engine speed, cam or valve timing) is sampled at predetermined intervals as describe at 608. The sampled operating condition or conditions may then be associated with the injector of a particular cylinder. For example, a change in engine load occurring between two cylinder intake events can be used to index table Inj_tab_start_1 to provide start of injection timing adjustments for cylinder number one injector.

In one embodiment, the sampled operating condition and time or cylinder event number since change in operating conditions may be used to index table Inj_tab_start_1, a two dimensional table that holds adjustments to start of injection timings that are related to a change in operating conditions. Further, additional dimensions may be added to the table to account for other variables that may affect start of injection timing. For example, change in engine load, time or cylinder event number since change in operating conditions, and engine temperature may index a three-dimensional version of table Inj_tab_start_1. And, additional tables are provided for cylinders 2-4. As an example, between intake valve opening of cylinder two and intake valve opening of cylinder one, engine load may change by 0.05 over 0.03 seconds. This corresponds roughly to a change of 1.6 load per second. Table Inj_tab_start_1 may be indexed using sampled operating conditions to a cell in the table that outputs a start of injection timing adjustment control variable Inj_adj_start_1 for cylinder number one based on a load rate of change of 1.6 and the time since the change in operating conditions occurred. The timer or cylinder event counter started at 604 outputs a variable that is used to index table Inj_tab_start_1. Two dimensional table Inj_adj_tab_start_1 may be populated with start of injection adjustments that vary with the change or rate of change in operating conditions and with time or cylinder event number. For example, the table may be populated such that start of injection timing is adjusted in proportion to a change in engine load. In this way, adjustments to engine start of injection timing may change in relation to the change in operating conditions and the time or number of cylinder events after the change in operating conditions is detected.

In addition, by adjusting the contents of table cells in relation to time since detecting a change in operating conditions, the duration that start of injection timing adjustments are made can be varied and tailored to reduce soot production as is desirable. For example, for cylinder number one, when a change in operating conditions is detected at a first amount or level, a first adjustment to cylinder number one start of injection timing is retrieved from table Inj_tab_start_1 at time zero. As time or number of cylinder events increase after the change in operating conditions is detected, the adjustments to start of injecting timing move from advanced of base_inj_start_loc to retarded of base_inj_start_loc. In other words, start of injection timing can move from a first crankshaft angle before a change in operating conditions to a second crankshaft angle that is advanced from the first crankshaft angle and then to a third crankshaft angle retarded from the first crankshaft angle in response to a change in operating conditions. Further, the crankshaft angular distance that start of injection moves from the start of injection timing before the change in operating conditions may be related to an amount of engine load change, amount of camshaft movement, change in EGR, change in engine speed, engine temperature or other operating condition. For example, in the above example, change in camshaft movement, change in EGR, or change in engine speed may be used to index Inj_tab_start_1. In this way, start of injection is moved away from base_inj_start_loc and then toward Inj_tab_start. Further, if there are one-after-the-other changes in operating conditions, Inj_adj_start_1 may advance and retard start of injection a plurality of times in response to a plurality of changes in operating conditions. Thus, start of injection timing can be adjusted in response to a transient change in operating conditions, and the change in start of injection timing may take place over a number of cylinder cycles. Further, the number of cylinder cycles for adjusting start of injection timing may be predetermined.

It should be noted that start of injection can be adjusted for a number of cylinder events, the number of cylinder events related to an engine condition. For example, start of injection timing can be adjusted for five cylinder events when engine temperature is less than a first threshold temperature and for 8 cylinder events when engine temperature is greater than the first threshold temperature. In one example embodiment, time or a number of cylinder events may be adjusted before being used to index table Inj_tab_start_1 so that the table is indexed at a different rate than if no adjustments were made. By multiplying time or number of cylinder events by a function related to engine temperature, engine load, fuel type or other condition, the duration of start of injection adjustments can be varied.

In an alternative embodiment, table Inj_tab_start_1 may be indexed by the magnitude of change of operating conditions during the sample interval, the cylinder number of interest, and the time or cylinder event number since change of operating conditions to output a start of injection timing adjustment for cylinder number one. Again, table Inj_tab_start_1 outputs control variable Inj_adj_start_1 which represents the change in start of injection timing for cylinder number one. Likewise, start of injection timing adjustments may be determined for additional cylinders applying similar tables and variables.

In addition, adjustments may be made to Inj_adj_start_1-4 variables before the variables are added to base_inj_start_loc. In one example, a function fn_fuel_mul is indexed by fuel type or by quantity of alcohol in the fuel. Function fn_fuel_mul outputs a variable that is multiplied with a variable that is used to index Inj_tab_start_1-4, change in engine load for example. Thus, table Inj_tab_start_1-4 can be indexed as a function of fuel type or alcohol content such that the output of Inj_tab_start_1-4 changes as fuel type or alcohol content changes. In one example, the function fn_fuel_mul goes from 0 to 1 depending on the type of fuel or content of alcohol in the fuel. Further, the start of injection timing can be moved closer to base_inj_start_loc as the alcohol content of the fuel decreases or as the volatility of the fuel increases by adjusting the entries of fn_fuel_mul. And, additional multipliers may be added to compensate for other operating conditions such as engine temperature, EGR rate, cam timing, and engine load, for example.

At 612, routine 600 outputs the change in start of injection timing by adding Inj_adj_start_1 and base_inj_start_loc to establish and output the start of injection timing for cylinder number one Likewise, base_inj_start_loc is added to Inj_adj_start_2-4 to establish the start of injection location for each cylinder.

At 614, routine 600 determines the rate and/or magnitude of transient engine conditions by the same method as at 608. Therefore, the description is not repeated for the sake of brevity.

At 616, routine 600 determines the trajectory for start of injection timing for all injectors. In one embodiment, one or more variables that may represent a change in operating conditions (e.g., engine load, EGR, engine speed, cam or valve timing) is sampled at predetermined intervals as describe at 608.

In one embodiment, the sampled operating condition and time or cylinder event number since change in operating conditions may be used to index table Inj_tab_start, a two-dimensional table that holds adjustments to start of injection timings that are related to a change in operating conditions. For example, between intake valve opening of cylinder two and intake valve opening of cylinder one, engine load may change by 0.05 over 0.03 seconds. As discussed above, this corresponds roughly to a change of 1.6 load per second. Table Inj_tab_start may be indexed using sampled operating conditions to a table cell that outputs a start of injection timing adjustment control variable Inj_adj_start. Base start of injection and Inj_adj_start are added and update injection timing for the next injector scheduled to open. Likewise, each injector subsequently scheduled to operate has its injection start of injection timing updated by indexing Inj_tab_start using operating conditions and time or number of cylinder events. Thus, start of injection timing for all cylinders may be updated by indexing a two dimensional table. The resulting start of injection profile may follow that illustrated in FIG. 5. Further, the timer or cylinder event counter started at 604 outputs a variable that is used to index table Inj_tab_start. Two dimensional table Inj_tab_start may be populated with start of injection adjustments that vary with the change or rate of change in operating conditions and with time or cylinder event number. In this way, adjustments to engine start of injection timing for all cylinder injectors may change in relation to the change in operating conditions and the time or number of cylinder events after the change in operating conditions is detected.

In addition, by adjusting the contents of table cells in relation to time since detecting a change in operating conditions, the duration that start of injection timing adjustments are made can be varied and tailored to reduce soot production as is desirable. For example, when a change in operating conditions is detected at a first amount or level, a first adjustment to start of injection timing is retrieved from table Inj_tab_start at time zero. As time or number of cylinder events increase after the change in operating conditions is detected, the adjustments to start of injecting timing move from advanced of base_inj_start_loc to retarded of base_inj_start_loc. In this way, start of injection is moved away from base_inj_start_loc and then toward base_inj_start_loc. Further, if there are one-after-the-other changes in operating conditions, Inj_adj_start may advance and retard start of injection a plurality of times in response to a plurality of changes in operating conditions.

In an alternative embodiment, table Inj_tab_start may be indexed by the magnitude of change of operating conditions during the sample interval and the time or cylinder event number since change of operating conditions to output a start of injection timing adjustment for cylinder number one. Again, table Inj_tab_start_all outputs control variable Inj_adj_start which represents the change in start of injection timing for all cylinder injectors.

In addition, adjustments may be made to Inj_adj_start variables before the variable is added to base_inj_start_loc. In one example, a function fn_fuel_mul that is indexed by fuel type or by quantity of alcohol in the fuel indexes a variable that is multiplied with the output of Inj_tab_start to modify Inj_adj_start. In one example, the function fn_fuel_mul goes from 0 to 1 depending on the type of fuel or content of alcohol in the fuel. Thus, Inj_adj_start can adjust the start of injection time according to a type of fuel. Further, the start of injection timing can be moved closer to base_inj_start_loc as the alcohol content of the fuel decreases or as the volatility of the fuel increases by adjusting the entries of fn_fuel_mul.

At 618, routine 600 outputs the change in start of injection timing by adding Inj_adj_start and base_inj_start_loc to establish and output the start of injection timing for next cylinder scheduled to operate. Thus, the trajectory programmed in to Inj_adj_start is applied to cylinders in the engine firing order after a change in operating conditions is detected.

At 620, routine 600 may judge whether or not the start of injection timing adjustments are complete or if an exit of routine 600 is requested or desired. In one embodiment, routine 600 determines whether or not the final row or column that corresponds to time or number of cylinder events since change in operating conditions has been entered. If so, or if an exit from routine 600 is requested or desired, routine 600 moves to 622. Otherwise, routine 600 moves to 606. In this way, routine 600 can complete start of injection timing adjustments by verifying cells in Inj_tab_start or Inj_tab_start1-4 have been accessed and used to adjust start of injection timing.

If routine 600 proceeds to 622 start of injection time goes to base_inj_start_loc as Inj_adj_start and Inj_adj_start1-4 are zeroed. Upon going from 620 to 622, the output start of injection timing from base_inj_start_loc may be retarded from start of injection timing output from base_inj_start_loc when routine 600 proceeded from 604 to 606. Thus, the start of injection timing after a change in operating conditions may be retarded from start of injection before the change in operating conditions.

At 622, routine 600 resets the flag set at 604 to indicate that start of injection timing procedure for the change in operating conditions has completed. Thus, by assessing the state of the flag, it may be determined whether or not start of injection timing is being adjusted for changes in operating conditions.

Thus, the method of FIG. 6 provides for directly injecting fuel to cylinder of an engine in response to a change in load, adjusting start of injection timing away from a first timing and then back toward said first timing to a second timing during the change in load, said second timing different from said first timing.

Further, the method of FIG. 6 also provides for directly injecting fuel to cylinder of an engine, at a first engine condition, executing start of injection at a first crankshaft angle; during a transition from said first engine condition to a second engine condition: adjusting said start of injection to a second crankshaft angle, said second crankshaft angle advanced of said first crankshaft angle; and adjusting said start of injection from said second crankshaft angle to a third crankshaft angle after injection at said second crankshaft angle, said third crankshaft angle retarded from said first crankshaft angle; and at the second engine condition, executing start of injection at the third crankshaft angle.

Further still, the method of FIG. 6 provides for a method for directly injecting a fuel to cylinder of an engine, comprising: at a first engine condition, executing start of injection at a first crankshaft angle; during a transition from said first engine condition to a second engine condition: adjusting said start of injection to a second crankshaft angle, said second crankshaft angle advanced of said first crankshaft angle, said start of injection held at said second crankshaft angle for a plurality of combustion events of said cylinder; and adjusting said start of injection to a third crankshaft angle after starting injection at said second crankshaft angle, said third crankshaft angle retarded from said first crankshaft angle; and at the second engine condition, executing start of injection at the third crankshaft angle.

In an alternative embodiment, an operating condition may be passed through a lead filter and the output of the lead filter applied to modify start of injection timing. For example, start of injection timing crankshaft angle can be multiplied by the output of the lead filter to adjust start of injection timing. Further, the gain of the lead filter may be proportional to the rate of change in operating conditions, the rate of change of engine load or EGR or cam timing, for example. Thus, the present method may be accomplished in a number of ways including ways that do not require table look-ups.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for directly injecting fuel to a cylinder of an engine, comprising:
   in response to a change in load, adjusting a start of injection timing away from a first timing and then back toward said first timing to a second timing during the change in load and over a plurality of spark ignited combustion events, said second timing different from said first timing, wherein an angular crankshaft distance said start of injection timing moves away from said first timing is related to an amount of load change.

2. The method of claim 1, wherein said start of injection timing is advanced from said first timing as said start of injection timing moves away from said first timing, and where said start of injection timing is retarded when said start of injection is moved toward said first timing.

3. The method of claim 1, wherein said second timing is retarded from said first timing, and where the start of injection timing is retarded to said second timing based on a number of combustion events.

4. The method of claim 1, wherein the angular crankshaft distance said start of injection timing moves away from said first timing is related to engine temperature.

5. The method of claim 1, further comprising continuing to adjust said start of injection timing based on a number of cylinder events after said change in load, said number of cylinder events related to a condition of said engine.

6. A method for directly injecting fuel to a cylinder of an engine, comprising:
   in response to a change in load, adjusting a start of injection timing away from a first timing and then back toward said first timing to a second timing during the change in load and over a plurality of spark ignited combustion events, said second timing different from said first timing, wherein an angular crankshaft distance said start of injection timing moves away from said first timing is related to an amount of engine speed change.

7. The method of claim 6, wherein said start of injection timing is advanced from said first timing as said start of injection timing moves away from said first timing, and where said start of injection timing is retarded when said start of injection timing is moved toward said first timing.

8. The method of claim 6, wherein said second timing is retarded from said first timing, and where the start of injection timing is retarded to said second timing based on a number of combustion events.

9. The method of claim 6, wherein an angular crankshaft distance said start of injection timing moves away from said first timing is related to engine temperature.

10. The method of claim 6, further comprising continuing to adjust said start of injection timing based on a number of cylinder events after said change in load, said number of cylinder events related to a condition of said engine.

* * * * *